Figure 1:
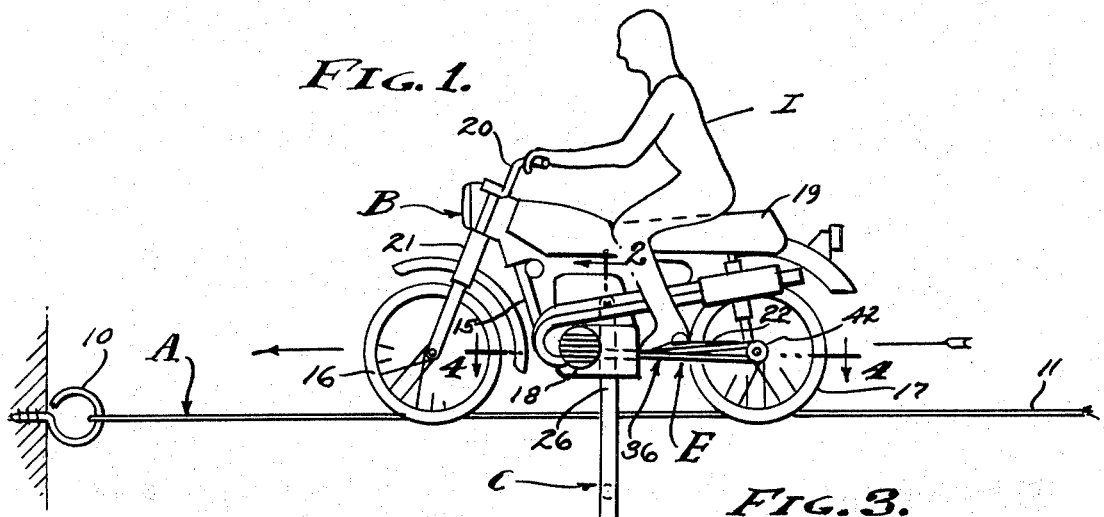

United States Patent [19]
Triska

[11] 3,802,119
[45] Apr. 9, 1974

[54] HIGH-WIRE SIMULATION TOY

[76] Inventor: Matej Karel Triska, 2265 N. Elizabeth St., Indianapolis, Ind. 46219

[22] Filed: Mar. 20, 1972

[21] Appl. No.: 236,035

[52] U.S. Cl. ............................................. 46/130
[51] Int. Cl. .......................................... A63h 13/12
[58] Field of Search ............. 46/137, 202, 100, 130

[56] References Cited
FOREIGN PATENTS OR APPLICATIONS
828,508    1952    Germany ............................ 46/100

Primary Examiner—Louis G. Mancene
Assistant Examiner—J. Q. Lever
Attorney, Agent, or Firm—William H. Maxwell

[57] ABSTRACT

A children's toy that simulates a tight rope circus act or performance wherein a motorcycle is operated by one performer to drive forward and backward upon a horizontally disposed high-wire, while two other performers are suspended from the cycle on a trapeze comprising a revolving ladder with said performers balanced at opposite ends thereof. The toy includes, a wire adapted to be tensioned and displaced from the horizontal so that a simulated motorcycle rolls forward and backward thereon by means of gravity, and drive means reversely turning the ladder of the trapeze in response to forward and backward movement of the motorcycle; the drive means being a speed reducing transmission that turns the ladder at a slow rate relative to the turning rate of the motorcycle wheels.

5 Claims, 4 Drawing Figures

PATENTED APR 9 1974

3,802,119

HIGH-WIRE SIMULATION TOY

BACKGROUND:

Toys of various kinds are available with objects operably supported upon strings or wires. However, a toy that simulates a high-wire circus act involving a motorcycle operated by gravity and animating simulated performers balancing a ladder on a trapeze suspended therefrom has been unavailable. The concept reduced to practice by me is a toy that is educational in its exihibition of engineering and skill involving weights and balance and related motions. To these ends, therefore, it is an object to provide a gravity operated an educational toy simulating such a high-wire act, or the like, which involves a display of engineering and skill, and a toy which is practical in nature while being entertaining.

FIELD OF INVENTION:

This invention relates to a toy simulation of a circus act, herein referred to as a high-wire motorcycle trapeze performance, it being an object to coordinate the simulated performance on a trapeze with the simulated driving of a motorcycle over a high-wire. It is also an object of this invention to provide realism in the simulated performance by proportionately reducing the speed of activity to a slow rate commensurate with the act simulated.

It is also an object of this invention to provide a toy simulator of the character referred to which is practical and safe in every respect and which is economical to manufacture and is durable for continued use and educational pleasure.

SUMMARY OF INVENTION:

The high-wire simulation toy hereinafter described is miniature and involves, generally, a wire A, a motorcycle B, a swinging trapeze C, a ladder D and a transmission means E. The parts and elements A through E inclusive are cooperatively combined into an apparatus-like structure adapted to be manipulated reciprocably along the wire A tensioned so as to be substantially horizontally disposed. By means of weights and balance inherent in the combination, the motorcycle remains erect while the trapeze C depends therefrom with the rotatable ladder D stabilized.

Figure 3:
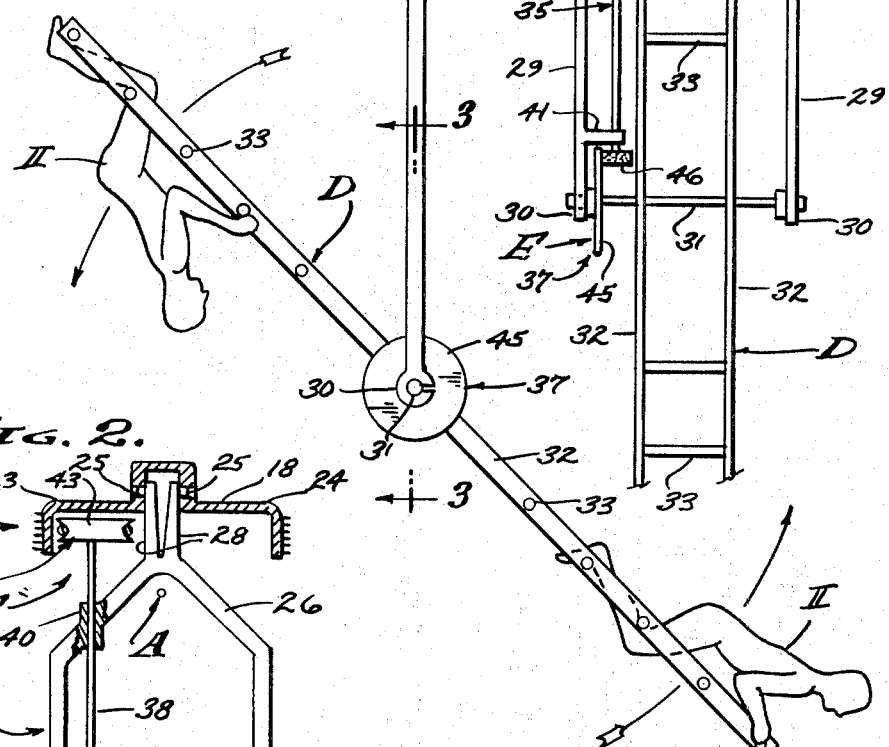
Figure 2:
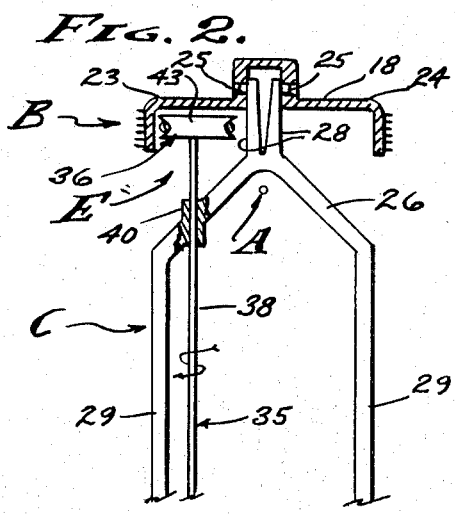
Figure 4:
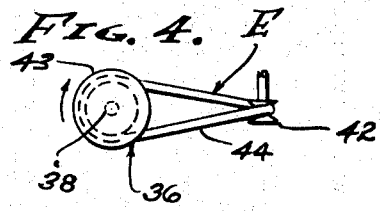

DRAWINGS:

The various objects and features of this invention will be fully understood from the following detailed description of the typical preferred form and application thereof, throughout which description reference is made to the accompanying drawings, in which: FIG. 1 is a side elevation of the high-wire simulation toy of the present invention, showing the wire A thereof displaced from the horizontal so that the motorcycle B moves forwardly to revolve the ladder D suspended by the trapeze C. FIGS. 2, 3 and 4 are sectional views taken as indicated by lines 2—2, 3—3 and 4—4 on FIG. 1.

PREFERRED EMBODIMENT:

The high-wire simulation toy of the present invention is adapted to be manipulated by one or more persons to move back and forth on a string or wire A held basically in a horizontal position. The driven distance is virtually unlimited within practical limits, and to this end the string or wire A is lengthy. In practice, a game can be made of this toy by a person manually holding each end of the string or wire, lifting and lowering, and also tensioning and slackening the wire. As shown, the wire A is anchored to a screw eye 10 at one end and manipulated by raising or lowering and by tensioning the other end 11. The wire A passes through the motorcycle-trapeze assembly, thereby capturing the apparatus upon said wire.

The motorcycle B is shown as a miniature of a typical motorcycle having a frame 15 with front and rear wheels 16 and 17, a model motor 18 (not operable as such), a saddle 19 and steering bars 20 (fixed). The motorcycle B is a molded or otherwise formed unit, for example of plastic with all parts and elements thereof fixed relative to the other except for the wheels 16 and 17 that are operable. Thus, the steering forks 21 have bearings on which the front wheels 16 are rotatable and the rear forks 22 having bearings on which the rear wheels are rotatable; the two wheels being journaled on spaced parallel and horizontally disposed transverse fixedly positioned axes.

The swinging trapeze C is shown to depend in its normal depending position from the motorcycle B, and accordingly a motorcycle type or design is employed which is conducive to accommodating both the trapeze C and the transmission E later described. In accordance with this invention, a model motor 18 of a flat twin engine is employed wherein the characteristic opposed cylinders 23 and 24 are open downwardly disposed shells partially housing portions of the transmission E. The model motor 18 opens downwardly and centrally where it carries a transverse trunnion 25 from which the trapeze C is suspended and swings.

The swinging trapeze C comprises a header 26 that extends transversely immediately below the engine-motor 18 and with opposite trunnions 25 from which two spaced and inwardly deflectable header elements 28 depend to carry the header above the wire A, the wheels 16 and 17 being channeled so as to remain in tracking engagement upon said wire. Symmetrically spaced legs 29 depend from header 26, said legs being parallel and terminating at lower ends having spaced bearings 30 disposed on a common horizontal transverse axis upon which the ladder D revolves. As is indicated, ladder D is pivoted to swing fore and aft and to depend perpendicularly when in a normal gravity positioned condition. The ladder D is carried by a rigid axle 31 journaled in the bearings 30; and ladder D comprises spaced parallel rails 32 with equally spaced rungs 33 extending transversely therebetween. In carrying out this invention, the ladder is somewhat less than twice the length of the legs 29, comprising two equal oppositely extending portions with the axle 31 disposed transversely therethrough midway between the opposite ends thereof. It will be seen that the ladder D will freely revolve on the axle 31.

Referring now to the automation of this act simulation toy, the transmission E is provided to drive the ladder D to revolve in response to turning of a motorcycle wheel and preferably the rear wheel 17. To this end the transmission E involves, generally, a transfer shaft 35, an input means 36 and an output means 37. The transfer shaft 35 can vary in type and is preferably a small diameter rod 38 carried on spaced upper and lower bearings 40 and 41 projecting from one of the legs 29, preferably inwardly projecting. As shown, the shaft rod 38 extends beyond the top and bottom of the leg 29 and is free to revolve. The input means 36 comprises a pair of spaced speed reduction pulleys 42 and 43 fixed to the rear wheel 17 and to the rod 38 respectively, and a belt 44 trained thereover and preferably an elastic belt engaged in deepened grooves in said pulleys, said grooves having flared flanged adapted to guide the belt thereon when misaligned (see FIG. 4). Note that the axes of pulley 42 and rod 38 are offset and normal with respect to each other. The output means 37 comprises a friction wheel drive wherein a wheel 45 on axle 31 is driven by pressured peripheral engagement of a roller 46 with its marginal portion. The roller 46 is fixed onto the bottom of shaft rod 38 and has a depressible tire that yieldingly engages with the wheel 45 to drive the same.

The toy apparatus thus far described is advantageously molded of plastic materials having the properties of substantial rigidity coupled with flexibility and adapted to be assembled and disassembled at will. That is, the cycle forks 21 and 22 can be spread for the assembly of the wheel trunnions therein. Also, the trunnions 25 of the swinging trapeze C can be deflected inwardly so as to enter the bearing openings shown. And further, the bearings 30, 40 and 41 of the trapeze can be split so as to receive the axle 31 and shaft rod 35 respectively; and all to the end that apparatus can be forceably assembled and disassembled simply by snapping the parts and elements together or apart.

From the foregoing it will be seen that I have provided an apparatus as described which motivates the ladder D causing it to rotate when the motorcycle B is moving so as to cause revolvement of its rear wheel 17. Operationally, therefore, the motivation is caused by manipulating the wire A in order to create an incline or decline as may be selectively required to gain the momentum desired. It is to be understood, however, that in real life the three individually acting performers are involved, one operating the motorcycle and the other two cooperatively balancing the ladder so that it revolves, there being no ladder drive in reality. To this end of simulated realism, this toy employes inanimate dolls and the transmission E in place of gymnastics of the performers. Consequently, the dolls are molded into the postures as shown and placed onto the apparatus in their respective positions. In practice, there are two types of dolls, the cyclist doll I and the gymnast doll II, two of the latter being employed. The single former cyclist doll I is formed so as to straddle the saddle 19 and with its four limbs in normal riding positions on the supports and controls. The two opposite gymnast dolls II are alike and formed so as to be forceably placed onto the ladder D in various positions, each doll II having flexed knees and ankles to oppositely engage over spaced ladder rungs 33 and with partially stretched arms to engage the opposite rails 32 of the ladder. As is indicated, the fingers of the hands are separated so as to be forceably engaged over the rails and thereby secure the dolls II in each instance in a selected position along the ladder, forward or backward, and at either side. The dolls II are weighted (head heavy) in order to accurately simulate a real performer, and thus the balance of the dolls II upon the ladder D requires discrimination all to be observed in the performance of the toy.

Having described only a typical preferred form and application of my invention, I do not wish to be limited or restricted to the specific details herein set forth, but wish to reserve to myself any modifications or variations that may appear to those skilled in the art:

I claim:

1. A self-powered toy simulation of a tightrope circus act wherein a vehicle is adapted to be operatively guided upon a high-wire with one simulated performer atop the vehicle and at least one other simulated performer suspended below the vehicle by a swinging trapeze, said toy including; a wire adapted to be manipulated and thereby tensioned and displaced from horizontal, a model vehicle with rotatable and spaced front and rear wheels adapted to ride upon said wire, a swinging trapeze in the form of a ladder comprising two parallel spaced rail members connected by a plurality of traverse rung member, said trapeze suspended from the vehicle intermediate said front and rear wheels by means of a header, said header being provided with spaced trunnions rotatably engaged in bearings in the vehicle on a fixedly positioned transverse axis therethrough and with a pair of legs depending in symmetrical fashion downwardly at opposite sides of the wire, said trapeze being connected to the header by a rotatable traverse axle journaled at and extending between the lower ends of said pair downwardly depending legs, transmission means connected to said axle for transmitting power to said axle, and at least one other simulated performer being located on said trapeze whereby movement of the vehicle along said wire as caused by displacement of the wire from the horizontal activates the transmission means to rotate said trapeze.

2. The act simulation toy as set forth in claim 1, wherein the said at least one other simulated performer is releasably connected to said trapeze balanced to spin with said transverse axle.

3. The act simulation toy as set forth in claim 1, wherein the transmission means comprises a transfer shaft carried by the swinging trapeze and with drive input means connected to said one of the vehicle wheels and drive output means connected to said traverse axle.

4. The act simulation toy as set forth in claim 1, wherein the transmission means comprises a transfer shaft carried by the swinging trapeze and with an input drive pulley is driven by a belt powered by a driving pulley connected to one of the vehicle wheels, and the output drive roller on the transfer shaft frictionally engages a wheel on said transverse axle.

5. The act simulation toy as set forth in claim 1, wherein the transmission means comprises a transfer shaft carried by and journaled alongside one of said downwardly depending legs with an input drive pulley connected to the top of said transfer shaft driven by a belt, said belt being also connected to a driving pulley turned by said one of the vehicle wheels, and an output drive roller connected to said transfer shaft at its lower end, said output roller frictionally engaging a wheel on said transverse axle.

* * * * *